United States Patent
Liao et al.

(10) Patent No.: US 9,719,821 B2
(45) Date of Patent: *Aug. 1, 2017

(54) MULTIPHASE FLOW MEASUREMENT

(71) Applicant: DELAVAL HOLDING AB, Tumba (SE)

(72) Inventors: Bohao Liao, Sollentuna (SE); Torbjorn Petterson, Gnesta (SE)

(73) Assignee: DELAVAL HOLDING AB, Tumba (SE)

( * ) Notice: Subject to any disclaimer, the term of this patent is extended or adjusted under 35 U.S.C. 154(b) by 627 days.

This patent is subject to a terminal disclaimer.

(21) Appl. No.: 14/353,550

(22) PCT Filed: Oct. 25, 2012

(86) PCT No.: PCT/SE2012/051149
§ 371 (c)(1),
(2) Date: Apr. 23, 2014

(87) PCT Pub. No.: WO2013/062474
PCT Pub. Date: May 2, 2013

(65) Prior Publication Data
US 2014/0297203 A1   Oct. 2, 2014

Related U.S. Application Data

(60) Provisional application No. 61/552,589, filed on Oct. 28, 2011.

(30) Foreign Application Priority Data

Oct. 28, 2011 (SE) .................................. 1151009

(51) Int. Cl.
*G01F 1/00* (2006.01)
*G01F 7/00* (2006.01)
(Continued)

(52) U.S. Cl.
CPC ....... *G01F 1/56* (2013.01); *A01J 5/01* (2013.01); *G01F 1/74* (2013.01)

(58) Field of Classification Search
CPC ......... G09G 2310/08; G09G 2320/066; G09G 2330/021; G09G 3/3648;
(Continued)

(56) References Cited

U.S. PATENT DOCUMENTS 4,751,842 A   6/1988   Ekrann et al.
5,116,119 A   5/1992   Brayer
(Continued)

FOREIGN PATENT DOCUMENTS

EP   1 155 610 A2   11/2001
FR   2 722 292 A1   1/1996
(Continued)

OTHER PUBLICATIONS

International-Type Search Report, dated Apr. 26, 2012, from corresponding PCT application.
(Continued)

*Primary Examiner* — Roy Y Yi
(74) *Attorney, Agent, or Firm* — Young & Thompson

(57) ABSTRACT

A flow measurement device includes a first sensor device that responds to stimulus from fluid medium flowing through a measurement section by registering a measure representing a physical characteristic, a processor, and a data storage including a look-up table containing a first collection of values representing a first value of flow of a first fluid or a first value of flow of a second fluid, and a second look-up table containing a second collection of the values representing a second value of the flow of the first fluid or a second value of the flow of the second fluid, the processor receiving the measures registered during a measurement time interval and estimating a flow pattern of the fluid medium during the
(Continued)

measurement interval where the flow pattern describes how the first and second fluids are distributed in the measurement section over the measurement time interval.

21 Claims, 2 Drawing Sheets

(51) Int. Cl.
    *G01F 1/56*     (2006.01)
    *A01J 5/01*     (2006.01)
    *G01F 1/74*     (2006.01)

(58) Field of Classification Search
    CPC ... G09G 2320/0238; G09G 2320/0646; G09G 3/2018; G09G 3/3406; G09G 2300/0452; G09G 2320/0285; G09G 2320/0626; G09G 3/2003; G09G 3/2081
    See application file for complete search history.

(56) References Cited

U.S. PATENT DOCUMENTS

| | | |
|---|---|---|
| 5,259,239 A | 11/1993 | Gaisford |
| 5,461,930 A | 10/1995 | Farchi et al. |
| 6,182,504 B1 | 2/2001 | Gaisford |
| 7,133,786 B1 | 11/2006 | Dykesteen et al. |
| 7,155,971 B2 | 1/2007 | Wamhof et al. |
| 2005/0034518 A1 | 2/2005 | Wamhof et al. |
| 2005/0103093 A1 | 5/2005 | Williams et al. |
| 2008/0236298 A1 | 10/2008 | Gysling |
| 2010/0321030 A1* | 12/2010 | Gale ............... F04B 51/00 324/537 |

FOREIGN PATENT DOCUMENTS

| | | |
|---|---|---|
| GB | 2 472 083 A | 1/2011 |
| RU | 2 164 340 C2 | 3/2001 |
| RU | 2 320 964 C2 | 3/2008 |
| RU | 2 382 989 C2 | 2/2010 |
| WO | 01/29518 A1 | 4/2001 |
| WO | 2010/068118 A1 | 6/2010 |

OTHER PUBLICATIONS

International Search Report, dated Mar. 13, 2013, from corresponding PCT application.

Supplementary International Search Report, dated Feb. 13, 2014, from corresponding PCT application.

* cited by examiner

MULTIPHASE FLOW MEASUREMENT

THE BACKGROUND OF THE INVENTION AND PRIOR ART

The present invention relates generally to measuring fluid flows. More particularly the invention relates to a device according to the preamble of claim 1 and a method according to the preamble of claim 9. The invention also relates to a computer program according to claim 14 and a computer readable medium according to claim 15.

Measuring a liquid flow is a relatively straightforward task provided that the flowing medium is homogenous, i.e. if there is only a single substance present in the conduit where the flow is to be measured. However, in practice, it is often the case that the flowing medium is non-homogenous, i.e. there is more than one substance present in the conduit. Moreover, the proportions between the different constituents in the flow may vary over time. As a result, it can be rather complicated to determine relevant flow measures. To mention a few examples, such liquid flows are common in milk extraction and transport, and in the oil and gas industry.

The prior art contains various examples of flow measurement solutions. For example WO 01/29518 discloses a solution for carrying out measurements of a pulsating milk flow in a line. Thus, here, the measured medium comprises a gas and a liquid. The line has a measuring region in which at least one parameter of the medium is determined during a measurement. The measuring region, in turn, may contain a measuring chamber in which milk remains after a pulse flow. This allows further analysis of the milk, such as color analysis.

U.S. Pat. No. 5,116,119 reveals a solution for measuring milk flows, wherein the liquid is directed to flow through one or more flow channels, while exposing the liquid to electromagnetic radiation.

The liquid's transparency to electromagnetic radiation is used to determine a momentary volume of the liquid flowing through each flow channel. The momentary velocity of the liquid flowing through the flow channels is also determined, thereby permitting a determination of the momentary flow rate of the liquid flowing through the flow channels.

EP 1 155 610 describes a quantity meter for determining the quantity of liquid flowing through a line. The quantity meter has two electrically conductive elements arranged in the line at a fixed measuring distance from each other. The conductive elements are connected to an electronic circuit. The diameter of the line is such that when the liquid is flowing there through the volume of the line across the measuring distance is completely filled for some time. Furthermore, in the electronic circuit the quantity of liquid flowing through is determined based on the measured electric conductivity of the liquid therein.

U.S. Pat. No. 7,155,971 shows a device for determining the volumetric flow rate of milk flowing during a milking process. Here, a cross-sectional area of the milk flow is determined at a first measuring point by means of a sensor, which is arranged outside the flowing milk. The time required by the milk flow, with the determined cross-sectional area, to go from the first measuring point to a second measuring point provided downstream from the first measuring point is measured. The flow speed is then derived from the measured time and the known distance between the first and second measuring points. The volumetric flow rate is determined on the basis of the determined cross-sectional area and the flow speed.

PROBLEMS ASSOCIATED WITH THE PRIOR ART

Hence, solutions are known in the prior art for determining a liquid flow in a fluid flow that contains both gas and liquid. Given that the overall liquid flow also is measured it is likewise possible to derive the gas flow based on the prior-art solutions. However, there is yet no fully reliable and efficient solution, which allows online measurement of a flow of a first fluid (e.g. a gas) and/or a flow of a second fluid (e.g. a liquid) in a fluid flow containing both the first and second fluids.

SUMMARY OF THE INVENTION

The object of the present invention is to mitigate the above problem, and thus offer an improved means for determining a flow of a first fluid or a flow of a second fluid in a fluid flow where the first and second fluids are mixed.

According to one aspect of the invention, the object is achieved by the initially described device, wherein the device comprises a processor and at least one data storage. The at least one data storage, in turn, includes first and second look-up tables. The first look-up table contains a first collection of values, where each value represents a first value of the flow of the first fluid or the flow of the second fluid for a given first measure; and the second look-up table contains a second collection of values, where each value represents a second value of the flow of the first fluid or the flow of the second fluid for a given first measure. The processor is configured to receive a series of first measures registered during a measurement interval, and based thereon, estimate a flow pattern of the fluid medium during said measurement interval. The processor is further configured to derive the flow of the first fluid or the flow of the second fluid by using the first look-up table, if the flow pattern fulfills a first flow-pattern criterion; and derive the flow of the first fluid or the flow of the second fluid by using the second look-up table, if the flow pattern fulfills a second flow-pattern criterion.

This device is advantageous because it provides straightforward information concerning the flow components of the constituents in mixed flow, such as the air and/or milk respectively in a milk conduit of a milking installation, or the oil and/or gas respectively in a pipeline.

Preferably, the processor is configured to interpolate between, or extrapolate from, the data in the look-up tables. Hence, the design becomes highly processing efficient.

According to a preferred embodiment of this aspect of the invention, the flow pattern describes how the first and second fluids are distributed in the measurement section over time. Hence, the flow pattern may be a statistical representation of a distribution of the first and second fluids in the measurement section. This is advantageous in relation to a measure expressing a simple ratio between the first fluid and the second fluid because any given such ratio may correspond to many different distributions of for example gas bubbles in a liquid ranging from one large bubble to a high number of very small bubbles. These differences can be captured in the form of various flow pattern classifications, which, in turn (given a particular flow rate), correspond to different flows of the first and second fluids.

According to another preferred embodiment of this aspect of the invention, the device contains a second sensor device, which is arranged in the measurement section. The second sensor device is configured to register a second measure representing a second type of physical characteristic of the fluid medium flowing through the measurement section. The second type of physical characteristic is different from the first type of physical characteristic. Consequently, the second measure is independent from the first measure. However, the first and second measures are both dependent on the flow of the first fluid and the flow of the second fluid in the fluid medium. By registering such first and second measures, it is possible for the processor to derive the flows of the first and second fluids flow in parallel.

According to yet another preferred embodiment of this aspect of the invention, the first look-up table contains a first collection of value pairs, where each value pair represents a first value of the flow of the first fluid and a first value of the flow of the second fluid for a given combination of the first and second measures. Analogously, the second look-up table contains a second collection of value pairs, where each value pair represents a second value of the flow of the first fluid and a second value of the flow of the second fluid for a given combination of the first and second measures. Here, the processor is configured to derive the gas flow and the liquid flow based on the first and second measures by using the first look-up table, if the flow pattern fulfills a first flow-pattern criterion; and using the second look-up table if the flow pattern fulfills a second flow-pattern criterion. Thus, adequate flow values are obtained in an efficient and straightforward manner.

According to still another preferred embodiment of this aspect of the invention, each of the first and second sensor devices comprises sensor means in the form of inductive sensor means, conductive sensor means, optical sensor means and/or acoustic sensor means. It should be noted that, although the first and second measures represent different types of physical characteristics, the first and second sensor devices may include the same types of sensor devices. The above-mentioned sensor devices are all beneficial because they are unobtrusive, i.e. do not influence the measurements as such.

According to another aspect of the invention, the object is achieved by the method described initially, wherein a series of first measures are received, which series of first measures are registered during a measurement interval. Based on said series of first measures, a flow pattern of the fluid medium during said measurement interval is estimated. Here, a first look-up table is used to derive the flow of the first fluid or the flow of the second fluid, if the flow pattern fulfills a first flow-pattern criterion; and a second look-up table is used to derive the flow of the first fluid or the flow of the second fluid, if the flow pattern fulfills a second flow-pattern criterion. The first look-up table contains a first collection of values, where each value represents a first value of the flow of the first fluid or the flow of the second fluid for a given first measure; and the second look-up table contains a second collection of values, where each value represents a second value of the flow of the first fluid or the flow of the second fluid for a given first measure. The advantages of this method, as well as the preferred embodiments thereof, are apparent from the discussion above with reference to the proposed device.

According to a further aspect of the invention the object is achieved by a computer program, which is directly loadable into the memory of a computer, and includes software adapted to implement the method proposed above when said program is run on a computer.

According to another aspect of the invention the object is achieved by a computer readable medium, having a program recorded thereon, where the program is to control a computer to perform the method proposed above when the program is loaded into the computer.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED
EMBODIMENTS OF THE INVENTION

Figure 1:
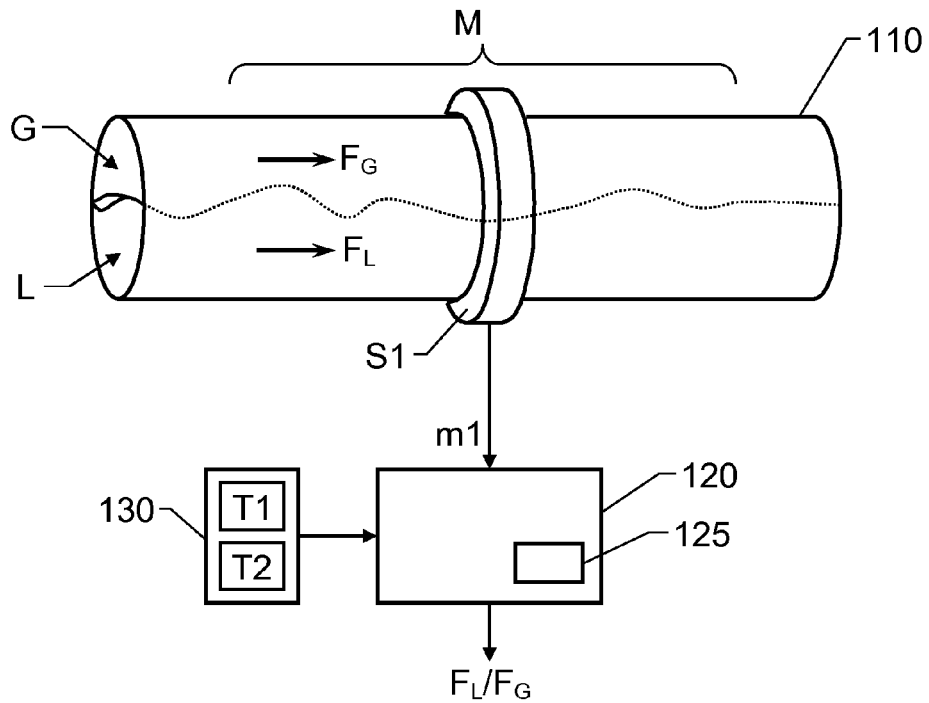
FIG. 1 shows a measurement section of a device according to a first embodiment of the invention.

Initially, we refer to FIG. 1, which shows a device according to a first embodiment of the invention. For simplicity, we will here assume that the first fluid represents a liquid L and that the second fluid represents a gas G, and consequently a liquid flow $F_L$ or a gas flow $F_G$ is to be determined in a fluid medium containing a mix of gas G and liquid L. The gas G, in turn, may contain air and the liquid L, in turn, may contain milk. Nevertheless, according to the invention, any alternative gas and liquid media are conceivable. Moreover, it should be noted that the invention is applicable to situations wherein the fluid medium contains a mix of different liquid media, e.g. water and oil, as well as other combinations of liquid and gas, such as oil/gas, water/steam, and oil/gas/water.

The proposed device includes a conduit 110, a first sensor device S1, a processor 120 and at least one data storage 130. The conduit 110, for example a milk line, is configured to receive and transport the fluid medium through a measurement section M in which the first sensor device S1 is arranged. The first sensor device S1 (here schematically illustrated as a ring around the conduit 110) is configured to register a first measure m1 representing a first type of physical characteristic of the fluid medium flowing through the measurement section M. The first measure m1 may express the speed of the fluid medium or represent a ratio between the amount of gas G and the amount of liquid L present in the measurement section M (where the first sensor device S1 is located), i.e. a filling degree.

The first sensor device S1 is configured to register the first measure m1 in response to energy fluctuations induced by the fluid medium flowing through the measurement section M. In other words, the first sensor device S1 is designed to respond to at least one stimulus caused by the fluid medium. To this aim, the first sensor device S1 may include one or more of the following: inductive sensors, conductive sensors, optical sensors and acoustic sensors.

As will be explained below, a flow pattern of the liquid medium is also derivable from the first measure m1. The flow pattern preferably describes how gas G and liquid L are distributed in the measurement section M over time. For example, the flow pattern is a statistical representation of a gas G and liquid L distribution in the measurement section M.

The processor 120 is further configured to derive either a gas flow $F_G$ or a liquid flow $F_L$ in the fluid medium based on the first measure m1. To this aim the processor 120 is connected to the at least one data storage 130, which includes first and second look-up tables T1 and T2 respectively, each containing data adapted to a particular type of flow pattern of the fluid medium.

The first look-up table T1 contains a first collection of values, where each value represents a first value of the liquid flow $F_L$ or the gas flow $F_G$ the for a given first measure m1. For example the data in the first look-up table T1 may be generated in a test environment, wherein the fluid medium is stimulated to show a first characteristic flow pattern, while a relatively large number of first measures m1 are registered (as reference values), and for each measure m1, a corresponding value of the liquid flow $F_L$ (or the gas flow $F_G$) is recorded via a dedicated flow meter.

Analogously, the second look-up table T2 contains a second collection of values, where each value represents a second value of the liquid flow $F_L$ or the gas flow $F_G$ the for a given first measure m1. The data in the second look-up table T2 is thus representative of a second characteristic flow pattern.

In order to determine which look-up table to use, the processor 120 is configured to receive a series of first measures m1 registered during a measurement interval (say 0.5 to 45 seconds), and based thereon, estimate a flow pattern of the fluid medium during the measurement interval. The flow pattern contains important information because the filling degree alone may not provide a sufficiently accurate measure of the liquid-gas distribution in the fluid conduit 110. Namely, a given filling degree (or ratio) between gas and liquid may correspond to anything from a liquid amount joined by a single gas bubble to the same liquid amount being fully foamed by microscopic bubbles. To determine the gas flow and/or liquid flow accurately, it is vital that such differences in the gas-liquid distribution are identified. Preferably, different distinctive flow patterns are determined based on averaging and statistical analysis of, for instance the spectral properties of the fluid flow.

Given that the processor 120 finds that the flow pattern fulfills a first flow-pattern criterion, the processor 120 is configured to derive the liquid flow $F_L$ (or the gas flow $F_G$) or by using the first look-up table T1. Correspondingly, if instead the processor 120 finds that the flow pattern fulfills a second flow-pattern criterion, the processor 120 is configured to derive the liquid flow $F_L$ (or the gas flow $F_G$) or by using the second look-up table T2.

Figure 2:
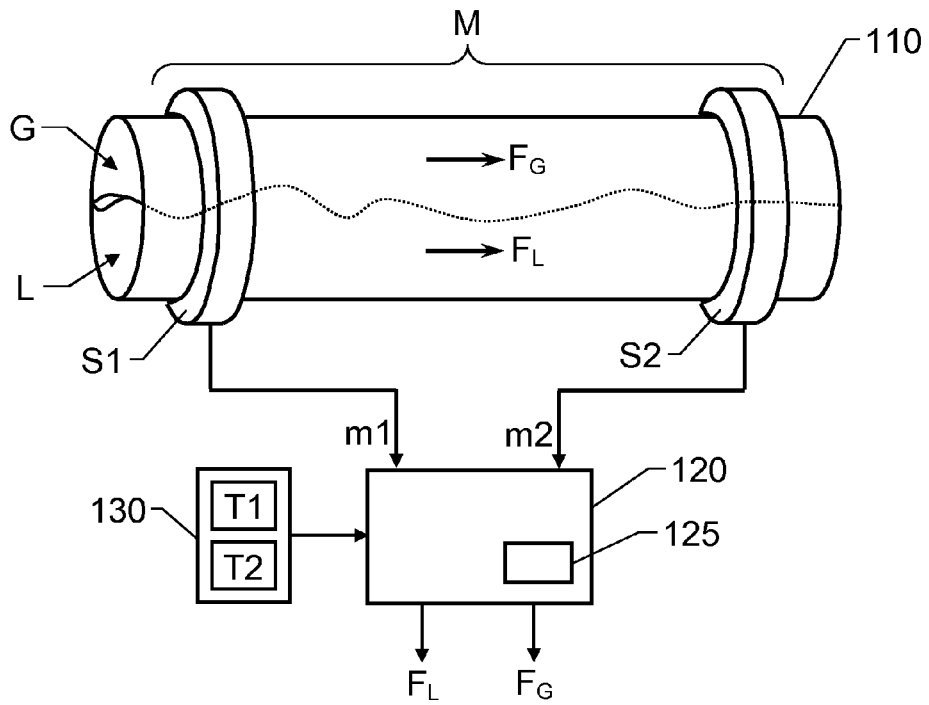
FIG. 2 shows a measurement section of a device according to a second embodiment of the invention.

Turning now to FIG. 2 we see a device according to a second embodiment of the invention. Here, the measurement section M contains a second sensor device S2 in addition to the first sensor device S1. Otherwise, all reference labels that also occur in FIG. 1 designate the same entities and parameters as those described above with reference to FIG. 1.

Analogous to the first sensor device, the second sensor device S2 is configured to respond to at least one stimulus caused by the fluid medium, and may thus include at least one inductive sensor, at least one conductive sensor, at least one optical sensor and/or at least one acoustic sensor. However, a second measure m2 registered by the second sensor device S2 represents a second type of physical characteristic, which is different from the first type of physical characteristic. This means that if for example the first measure m1 represents the speed of the fluid medium, the second measure m2 is a non-speed measure, such as the ratio between the amounts of gas G and liquid L in the measurement section M. Depending on what the first measure m1 represents, the second measure m2 may represent the speed of the fluid medium, a ratio between the amount of gas G and the amount of liquid L present in the measurement section M (where the second sensor device S2 is located), a pressure drop over a well-defined conduit segment of the measurement section M, or a flow pattern provided that the first and second measures m1 and m2 are different from one another.

Since the second measure m2 reflects a physical characteristic of a type different from that of the first measure m1, the second measure m2 is independent from the first measure m1.

Each sensor device S1 and S2 may contain two or more sensor elements. For instance, a conductive sensor configured to register a measure m1/m2 in the form of a volumetric flow rate requires at least two separate sensor elements to determine a travel time across a known distance. In order to calibrate the conductive sensor elements it is preferable if the measurement section M includes a designated space (e.g. a cavity, groove or other suitable volume) configured to temporarily store an amount of the fluid medium. Repeated electrical conductivity reference measurements can then be executed with respect to the amount of fluid medium in the designated space.

As is apparent from the embodiment illustrated in FIG. 2, the first sensor device S1 is arranged upstream of the second sensor device S2 in the measurement section M relative to a flow direction of the fluid medium. This is merely equivalent to the fact that the sensor devices S1 and S2 are physically separated from one another along the flow direction of the fluid medium. According to other embodiments of the invention (not shown), the sensor devices S1 and S2 may equally well be co-located in the measurement section M. The specific design chosen depends on which type(s) of sensor elements that are included in the sensor devices S1 and S2.

The processor 120 is configured to derive the liquid flow $F_L$ and the gas flow $F_G$ based on the first and second measures m1 and m2 respectively. This is possible because the first and second measures m1 and m2 are mutually independent and both dependent on the two flow components $F_G$ and $F_L$.

Mathematically, this can be expressed as:

$$\begin{pmatrix} m1 \\ m2 \end{pmatrix} = \begin{pmatrix} f1(F_G, F_L) \\ f2(F_G, F_L) \end{pmatrix} \quad (1)$$

where $f1(F_G, F_L)$ is a first function of the gas flow $F_G$ and the liquid flow $F_L$ and $f2(F_G, F_L)$ is a second function of the gas flow $F_G$ and the liquid flow $F_L$.

Of course, since m1 and m2 are mutually independent, the relationship (1) is invertible to obtain the expression:

$$\begin{pmatrix} F_G \\ F_L \end{pmatrix} = \begin{pmatrix} F1(m1, m2) \\ F2(m1, m2) \end{pmatrix} \quad (2)$$

where $F1(m1, m2)$ is a first function of the measures m1 and m2 and $F2(m1, m2)$ is a second function of the measures m1 and m2.

It is worth noticing that, according to the present invention, it is possible to generalize the expressions (1) and (2), such that n individual flows may be determined in a fluid flow containing n different fluids provided that n mutually independent measures are registered in respect of the fluid flow.

In practice it may be very difficult to derive the expression (2) analytically. Therefore, also in this case, it is preferable if the data storage 130 includes look-up tables T1 and T2 containing representative flow values.

Specifically, the first look-up table T1 contains a first collection of value pairs, where each value pair represents a first value of the gas flow $F_G$ and a first value of the liquid flow $F_L$ for a given combination of the first and second measures m1 and m2 respectively. The second look-up table T2 contains a second collection of value pairs, where each value pair representing a second value of the gas flow $F_G$ and a second value of the liquid flow $F_L$ for a given combination of the first and second measures m1 and m2 respectively.

The processor 120 is configured to derive the liquid flow $F_L$ and the gas flow $F_G$ based on the first and second measures m1 and m2 by using the first look-up table T1, if the flow pattern fulfills a first flow-pattern criterion; and using the second look-up table T2, if the flow pattern fulfills a second flow-pattern criterion.

Preferably, the processor 120 includes, or is associated with, a computer readable medium 125, e.g. in the form of a memory module, such that the processor 120 has access to the contents of this medium 125. Furthermore, a program is recorded in the computer readable medium 125, and the program is adapted to make the processor 120 control the process described above, as well as the embodiments thereof further elaborated on below, when the program is run on the processor 120.

Figure 3A:
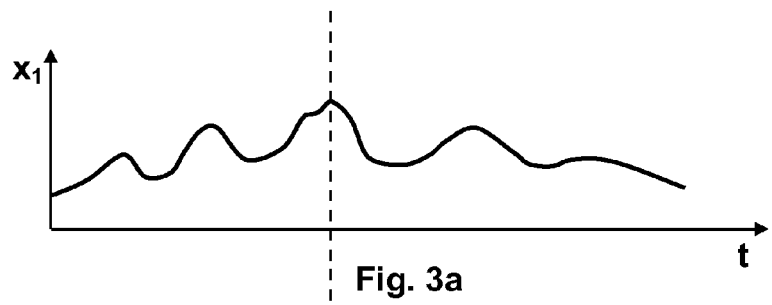
FIGS. 3a-c illustrate how an overall flow rate may be determined according to one embodiment of the invention.
Figure 3B:
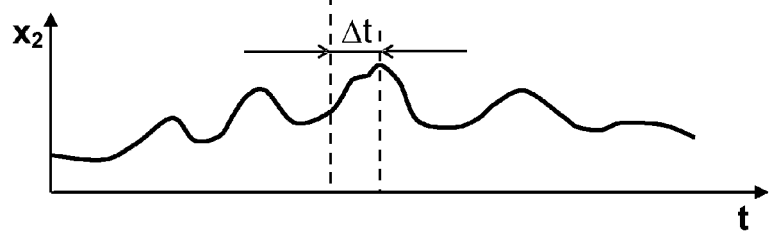

FIG. 3a shows a first graph expressing a first parameter $x_1$ as a function of time t. FIG. 3b shows a second graph expressing a second parameter $x_2$ as a function of time t. For example, the first and second parameters $x_1$ and $x_2$ may represent a ratio between an amount of gas G and an amount of liquid L in the measurement section M at the positions for the first and second sensor devices S1 and S2 respectively.

Figure 3C:
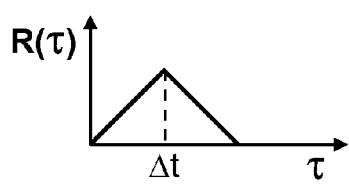

FIG. 3c shows a third graph expressing a cross correlation $R(\tau)$ between the first and second parameters $x_1$ and $x_2$ for different time offsets $\tau$. As can be seen, there is a distinct peak value in the cross correlation function $R(\tau)$ for a time offset $\Delta t = a\tau$, where a is a sampling interval. This is equivalent to that the average travelling time for the liquid flow between the position for the first sensor device S1 and the position for the second sensor device S2 is $\Delta t$. Given that the distance $s_{S1-S2}$ between these two positions is known, the overall flow rate $v_F$ of the liquid flow can be determined as:

$$V_F = \frac{s_{S1-S2}}{\Delta t} \quad (3)$$

The cross correlation $R(\tau)$ may be calculated as:

$$R(\tau) = \sum_{t=1}^{N} x_1(t-\tau) x_2(t) \quad (4)$$

where N is a last sample of a sampling period, preferably corresponding to a measuring interval of 1 to 5 seconds in respect of the parameters $x_1$ and $x_2$.

Figure 4:
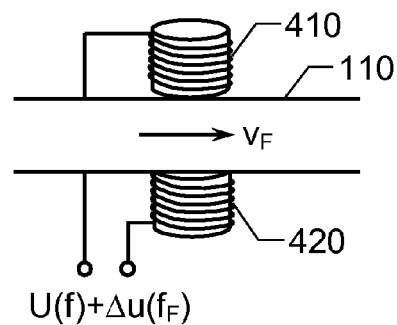
FIG. 4 illustrates how a proposed inductive sensor measures the speed of a flowing fluid medium.

FIG. 4 illustrates how a proposed inductive sensor element measures the speed of a flowing fluid containing gas and liquid.

Here, a first coil for electric current 410 is arranged on a first side of a conduit 110 for the fluid, and a second coil for electric current 420 is arranged on a second side of the conduit 110 opposite to the first side. An alternating voltage U(f) is applied between a pair of terminals connected to the first and second coils 410 and 420 respectively. The alternating voltage U(f) may have a frequency f at 20 kHz to 60 kHz, preferably around 40 kHz. Depending on the speed $v_F$ of the flowing fluid a voltage $\Delta u(f_F)$ is also induced in the coils 410 and 420. Thus, the deviations $\Delta u(f_F)$ from the applied voltage U(f) represents a measure of the speed of the flowing fluid.

Figure 5:
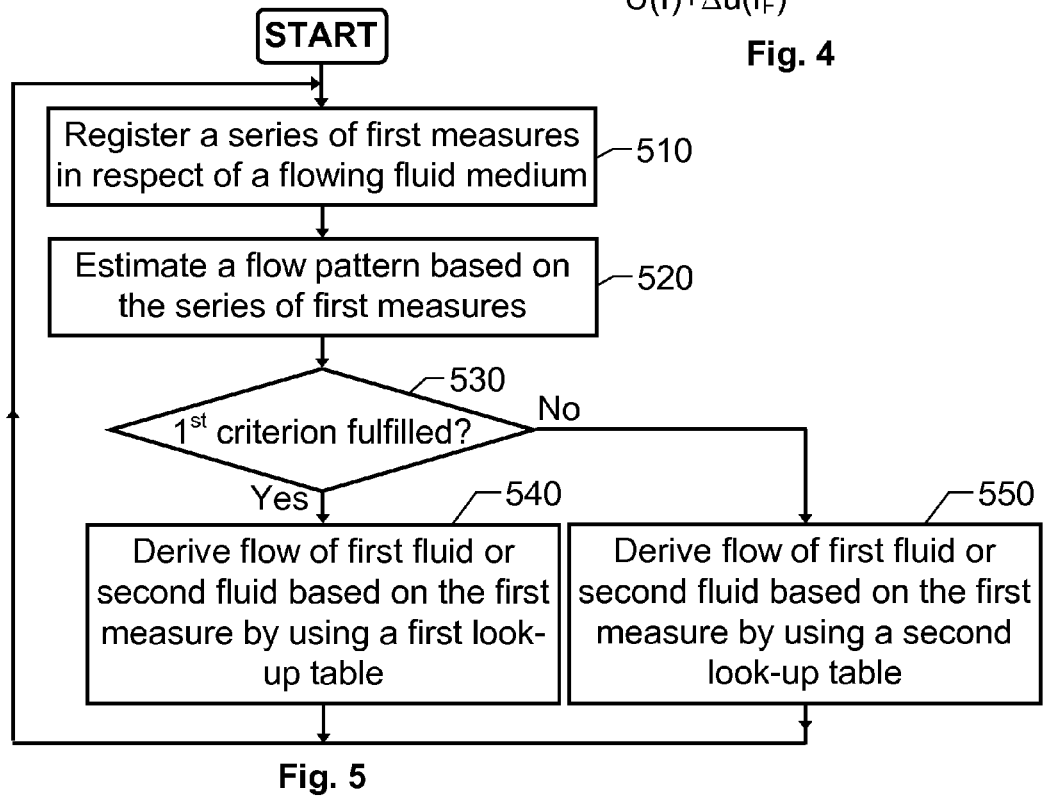
FIG. 5 illustrates, by means of a flow diagram, the general method according to the invention.

In order to sum up, and with reference to the flow diagram in FIG. 5, we will now describe the general method according to the invention for determining a liquid flow or a gas flow in a fluid medium containing a mix of gas and liquid.

During a measurement interval, a first step 510 registers, via a first sensor device S1, a series of first measures m1 in respect of the fluid medium while passing through a measurement section M of a conduit 110 for the fluid medium. Based on the first series of measures m1, a second step 520 estimates a flow pattern of the fluid medium during said measurement interval.

Subsequently, a step 530 checks whether or not a first flow-pattern criterion is fulfilled, and if so, a step 540 follows. Otherwise, the procedure continues to a step 550.

Step 540 derives the liquid flow $F_L$, or the gas flow $F_G$, based on the first measure m1, and by using a first look-up table T1, which is adapted to a first characteristic flow pattern. The first look-up table T1 contains a first collection of values, where each value represents a first value of the gas flow $F_G$, or the liquid flow $F_L$, for a given first measure m1;

In this example, for simplicity, we assume that a non-fulfillment of the first flow-pattern criterion is equivalent to fulfilling a second flow-pattern criterion. However, according to the invention, the flow pattern estimated in step 520 may be specifically tested against a second flow-pattern criterion to determine whether or not the second flow-pattern criterion is fulfilled. Moreover, it is likewise possible to test the flow pattern against further specific flow-pattern criteria, and use additional look-up tables adapted to such flow patterns.

In any case, step 550 derives the liquid flow $F_L$, or the gas flow $F_G$, based on the first measure, and by using a second look-up table T2, which is adapted to a second characteristic flow pattern. The second look-up table T2 contains a second collection of values, where each value represents a second value of the gas flow $F_G$, or the liquid flow $F_L$, for a given first measure m1.

Thereafter, the procedure loops back to step 510 for updated registering of first measures m1.

All of the process steps, as well as any sub-sequence of steps, described with reference to FIG. 5 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention.

The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means.

Alternatively, the carrier may be an integrated circuit in which the program is embedded, the integrated circuit being adapted for performing, or for use in the performance of, the relevant processes.

Although the invention is advantageous in connection with cow milking, the invention is equally well adapted for implementation in milking machines for any other kind of mammals, such as goats, sheep or buffaloes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A device for measuring a flow within a fluid medium, the device comprising:
   a conduit (110) with a measurement section (M) that in use receives and transports a flow (FG) of a first fluid (G) and a flow (FL) of the second fluid (L) within the fluid medium flowing through the measurement section (M);
   a first sensor device (S1) arranged in the measurement section (M), wherein the first sensor device responds to at least one stimulus caused by the fluid medium by registering a first measure (m1) representing a first type of physical characteristic of the fluid medium flowing through the measurement section (M);
   a processor (120) operatively connected to the first sensor device (S1); and
   a data storage (130) including
   i) a first look-up table (T1) representative of a first characteristic flow pattern of the fluid medium and containing a first collection of values, each value respectively representing a first value of the flow (FG) of the first fluid (G) or a first value of the flow (FL) of the second fluid (L) for a given first measure (m1), and
   ii) a second look-up table (T2) representative of a second characteristic flow pattern of the fluid medium and containing a second collection of the values, each value respectively representing a second value of the flow (FG) of the first fluid (G) or a second value of the flow (FL) of the second fluid (L) for the given first measure (m1), wherein
   the processor (120) receives a series of the first measures (m1) registered during a measurement time interval, and based on the received series of the first measures (m1), estimates a flow pattern of the fluid medium during said measurement interval where the flow pattern describes how the first and second fluids are distributed in the measurement section over the measurement time interval,
   when the flow pattern fulfills a first flow-pattern criterion, the processor derives the flow (FG) of the first fluid (G) or the flow (FL) of the second fluid (L) using the first look-up table (T1), and
   when the flow pattern fulfills a different, second flow-pattern criterion, the processor derives the flow (FG) of the first fluid (G) or the flow (FL) of the second fluid (L) by using the second look-up table (T2).

2. The device according to claim 1, wherein,
   the flow pattern is a statistical representation of the distribution of the first and second fluids in the measurement section over the measurement time interval,
   the first flow-pattern criterion corresponds to a first flow pattern classification, and
   the second flow-pattern criterion corresponds to a second flow pattern classification.

3. The device according to claim 1, wherein the measurement time interval is in a range of 0.5 to 45 seconds.

4. The device according to claim 1, wherein the measurement time interval is in a range of 1 to 5 seconds.

5. The device according to claim 1, further comprising a second sensor device (S2) arranged in the measurement section (M) and operatively connected to the processor,
   wherein the second sensor device responds to at least one other stimulus caused by the fluid medium by registering a second measure (m2) representing a second type of physical characteristic of the fluid medium flowing through the measurement section (M), the second type physical characteristic of the fluid medium being different from the first type physical characteristic of the fluid medium, the second measure (m2) being independent from the first measure (m1), and the first and second measures (m1, m2) both being dependent on the flow (FG) of the first fluid (G) and on the flow (FL) of the second fluid (L) in the fluid medium in the measurement section (M).

6. The device according to claim 5, wherein,
   i) the first look-up table (T1) contains a first collection of value pairs, each value pair respectively representing the first value of the flow (FG) of the first fluid (G) and the first value of the flow (FL) of the second fluid (L) for a given combination of the first and second measures (m1, m2), and
   ii) the second look-up table (T2) contains a second collection of value pairs, each value pair respectively representing the second value of the flow (FG) of the first fluid (G) and the second value of the flow (FL) of the second fluid (L) for a given combination of the first and second measures (m1, m2), and
   the processor (120) receives a series of the first and second measures (m1, m2) registered during the measurement time interval, and based on the received series of the first and second measures (m1, m2), estimates the flow pattern of the fluid medium during said measurement interval where the flow pattern describes how the first and second fluids are distributed in the measurement section over the measurement time interval,
   when the flow pattern fulfills a first flow-pattern criterion, the processor derives the flow (FG) of the first fluid (G) and the flow (FL) of the second fluid (L) using the first look-up table (T1); and
   when the flow pattern fulfills the second flow-pattern criterion, the processor derives the flow (FG) of the first fluid (G) and the flow (FL) of the second fluid (L) by using the second look-up table (T2).

7. The device according to claim 5, wherein,
the first measure (m1) and the second measure (m2) are sufficient to solve both i) a first function (F1(m1,m2)) that defines the flow (FG) of the first fluid (G) and ii) a second function (F2(m1,m2)) that defines the flow (FL) of the second fluid (L).

8. The device according to claim 6, wherein in the first and second look-up tables (T1, T2), each first and second value of the flow (FG) of the first fluid (G) respectively represents a gas flow and each first and second value of the flow (FL) of the second fluid (L) represents a liquid flow.

9. The device according to claim 6, wherein,
wherein the first sensor device (S1) comprises an inductive sensor,
the first measure (m1) represents a speed of the fluid medium,
the inductive sensor comprises a first coil for electric current (410) arranged on a first side of a conduit (110), and a second coil for electric current (420) arranged on a second side of the conduit (110) opposite to the first side, and when an alternating voltage (U(f)) of a known applied voltage is applied between a pair of terminals connected to the first and second coils respectively, the speed of the flowing fluid is represented by deviations from the applied voltage.

10. The device according to claim 1, wherein the first sensor device (S1) comprises a conductivity sensor.

11. The device according to claim 6, wherein,
the first measure (m1) represents a speed of the fluid medium, and
the second measure (m2) represents a ratio of an amount of a gas (G) and an amount of a liquid (L) present in the measurement section (M), the ratio indicating a filling degree of the measurement section (M).

12. The device according to claim 1, wherein in the first and second look-up tables (T1, T2), each first and second value of the flow (FG) of the first fluid (G) respectively represents a gas flow and each first and second value of the flow (FL) of the second fluid (L) represents a milk flow.

13. The device according to claim 1, wherein in the first and second look-up tables (T1, T2), each first and second value of the flow (FG) of the first fluid (G) respectively represents a gas flow and each first and second value of the flow (FL) of the second fluid (L) represents an oil flow.

14. The device according to claim 12, wherein,
in the first look-up table (T1), each value respectively represents the first value of the flow (FL) of milk,
in the second look-up table (T2), each value respectively represents the second value of the flow (FL) of the milk,
when the flow pattern fulfills the first flow-pattern criterion, the processor derives the flow (FL) of the milk using the first look-up table (T1); and
when the flow pattern fulfills the second flow-pattern criterion, the processor derives the flow (FL) of the milk by using the second look-up table (T2).

15. The device according to claim 13, wherein,
in the first look-up table (T1), each value respectively represents the first value of the flow (FL) of oil,
in the second look-up table (T2), each value respectively represents the second value of the flow (FL) of the oil,
when the flow pattern fulfills the first flow-pattern criterion, the processor derives the flow (FL) of the oil using the first look-up table (T1); and
when the flow pattern fulfills the second flow-pattern criterion, the processor derives the flow (FL) of the oil by using the second look-up table (T2).

16. The device according to claim 6, wherein,
in the first and second look-up tables (T1, T2), each first and second value of the flow (FG) of the first fluid (G) respectively represents a gas flow and each first and second value of the flow (FL) of the second fluid (L) represents a milk flow,
when the flow pattern fulfills a first flow-pattern criterion, the processor derives the flow (FG) of the gas and the flow (FL) of the milk using the first look-up table (T1); and
when the flow pattern fulfills the second flow-pattern criterion, the processor derives the flow (FG) of the gas and the flow (FL) of the milk by using the second look-up table (T2).

17. The device according to claim 6, wherein,
in the first and second look-up tables (T1, T2), each first and second value of the flow (FG) of the first fluid (G) respectively represents a gas flow and each first and second value of the flow (FL) of the second fluid (L) represents an oil flow,
when the flow pattern fulfills a first flow-pattern criterion, the processor derives the flow (FG) of the gas and the flow (FL) of the oil using the first look-up table (T1); and
when the flow pattern fulfills the second flow-pattern criterion, the processor derives the flow (FG) of the gas and the flow (FL) of the oil by using the second look-up table (T2).

18. The device according to claim 1, wherein,
wherein device is free of any sensors other than said first sensor device, and
said processor derives the flow (FG) of the first fluid (G) and the flow (FL) of the second fluid (L) free of any measure representing any characteristic of the fluid medium flowing through the measurement section (M) other than said first measure (m1).

19. The device according to claim 6, wherein,
wherein the device is free of any sensors other than said first and second sensor devices, and
said processor derives the flow (FG) of the first fluid (G) and the flow (FL) of the second fluid (L) free of any measure representing any characteristic of the fluid medium flowing through the measurement section (M) other than said first and second measures (m1, m2).

20. A method of measuring a flow within a fluid medium, the method comprising:
having a device that includes a conduit (110) with a measurement section (M) receive and transport a flow (FG) of a first fluid (G) and a flow of the second fluid (L) within the fluid medium flowing through the measurement section (M);
registering a first measure (m1) representing a first type of physical characteristic of the fluid medium flowing through the measurement section (M) from a first sensor device (S1) arranged in the measurement section (M), wherein the first sensor device responds to at least one stimulus caused by the fluid medium by registering the first measure (m1);
deriving the flow (FG) of the first fluid (G) or the flow (FL) of the second fluid (L), based on the registered first measure (m1) using a processor (120) operatively connected to the first sensor device (S1), and a data storage (130) that includes i) a first look-up table (T1) containing a first collection of values, each value respectively representing a first value of the flow (FG) of the first fluid (G) or a first value of the flow (FL) of the second fluid (L) for a given first measure (m1) over a measurement time interval during a first characteristic flow pattern, and ii) a second look-up table (T2) containing a second collection of the values, each value respectively representing a second value of the flow (FG) of the first fluid (G) or a second value of the flow (FL) of the second fluid (L) for the given first measure (m1) over a measurement time interval during a second characteristic flow pattern, wherein, the processor (120) receives a series of the first measures (m1) registered during the measurement time interval, and based on the received series of the first measures (m1), estimates a flow pattern of the fluid medium during said measurement interval where the flow pattern describes how the first and second fluids are distributed in the measurement section over the measurement time interval, when the flow pattern fulfills a first flow-pattern criterion, the processor derives the flow (FG) of the first fluid (G) or the flow (FL) of the second fluid (L) using the first look-up table (T1); and when the flow pattern fulfills a different, second flow-pattern criterion, the processor derives the flow (FG) of the first fluid (G) or the flow (FL) of the second fluid (L) by using the second look-up table (T2).

21. A non-transitory computer-readable medium having a computer program recorded thereon, the computer program, when executed on a processor, causes the processor to execute a method of measuring a flow within a fluid medium, the method comprising:

the processor communicating with a device that includes a conduit (110) with a measurement section (M) receive and transport a flow (FG) of a first fluid (G) and a flow of the second fluid (L) within the fluid medium flowing through the measurement section (M);

the processor receiving a first measure (m1) representing a first type of physical characteristic of the fluid medium flowing through the measurement section (M) from a first sensor device (S1) arranged in the measurement section (M), wherein the first sensor device responds to at least one stimulus caused by the fluid medium by registering the first measure (m1); and the processor deriving the flow (FG) of the first fluid (G) or the flow (FL) of the second fluid (L), based on the registered first measure (m1) and a data storage (130) that includes i) a first look-up table (T1) containing a first collection of values, each value respectively representing a first value of the flow (FG) of the first fluid (G) or a first value of the flow (FL) of the second fluid (L) for a given first measure (m1) over a measurement time interval during a first characteristic flow pattern, and ii) a second look-up table (T2) containing a second collection of the values, each value respectively representing a second value of the flow (FG) of the first fluid (G) or a second value of the flow (FL) of the second fluid (L) for the given first measure (m1) over a measurement time interval during a second characteristic flow pattern, wherein, the processor (120) receives a series of the first measures (m1) registered during the measurement time interval, and based on the received series of the first measures (m1), estimates a flow pattern of the fluid medium during said measurement interval where the flow pattern describes how the first and second fluids are distributed in the measurement section over the measurement time interval, when the flow pattern fulfills a first flow-pattern criterion, the processor derives the flow (FG) of the first fluid (G) or the flow (FL) of the second fluid (L) using the first look-up table (T1); and when the flow pattern fulfills a different, second flow-pattern criterion, the processor derives the flow (FG) of the first fluid (G) or the flow (FL) of the second fluid (L) by using the second look-up table (T2).

* * * * *